UNITED STATES PATENT OFFICE.

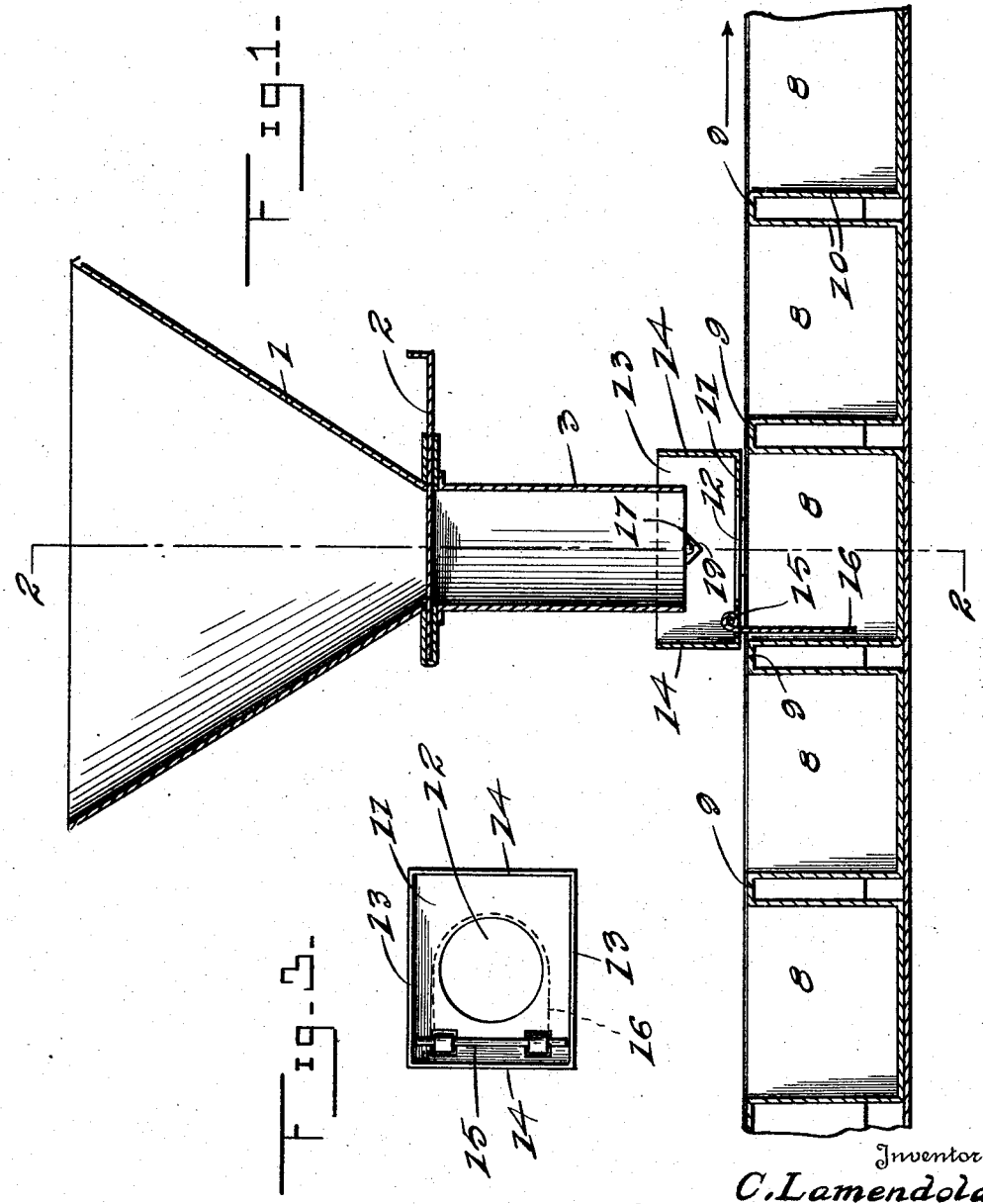

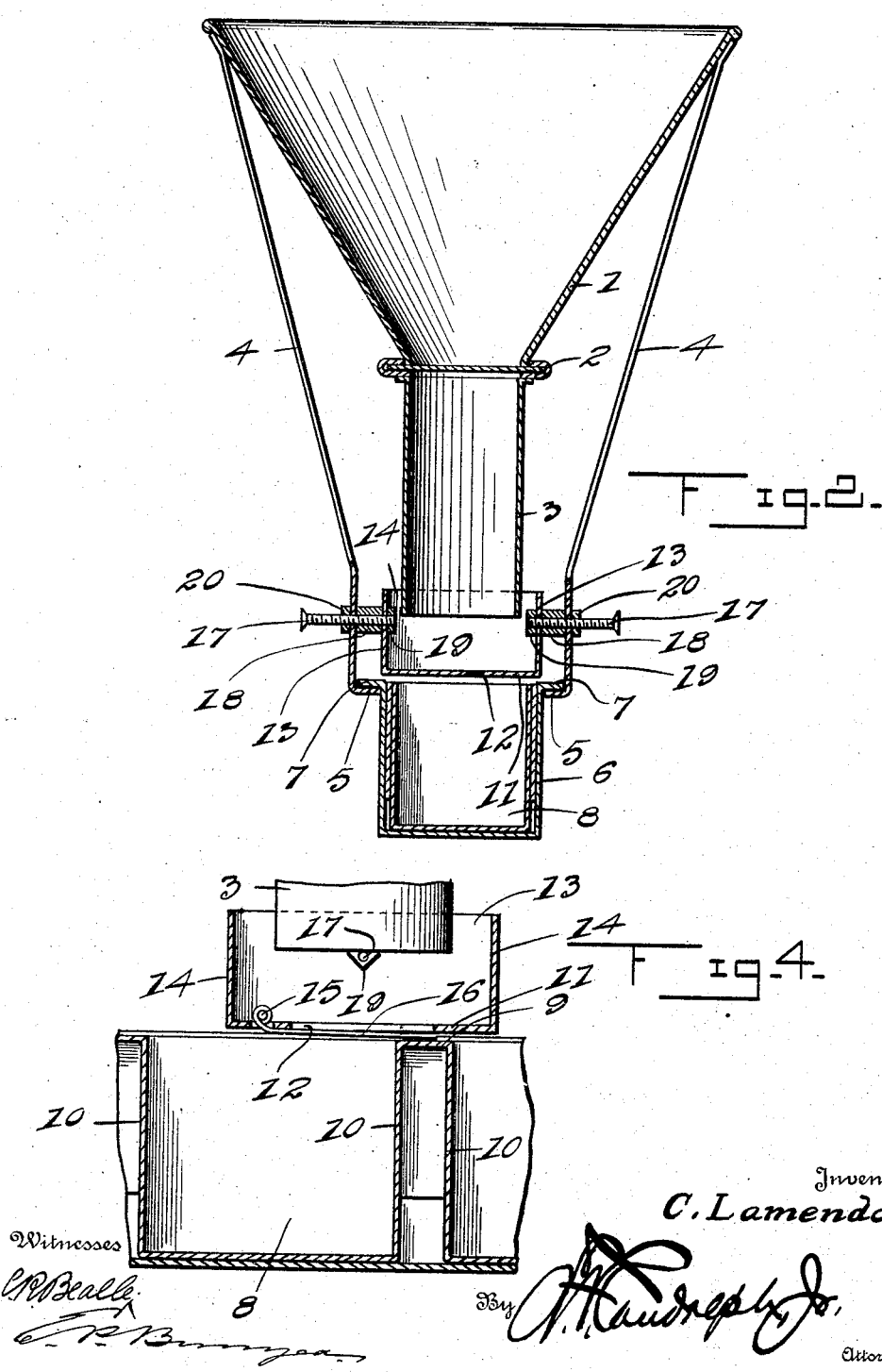

CALOGERO LAMENDOLA, OF INDEPENDENCE, KANSAS.

AUTOMATIC LOADING DEVICE.

1,183,742.　　　　　Specification of Letters Patent.　　Patented May 16, 1916.

Application filed January 2, 1915. Serial No. 237.

*To all whom it may concern:*

Be it known that I, CALOGERO LAMENDOLA, a subject of the King of Italy, residing at Independence, in the county of Montgomery and State of Kansas, have invented certain new and useful Improvements in Automatic Loading Devices; and I do hereby declare the following to be a full, clear, and exact description of the invention, such as will enable others skilled in the art to which it appertains to make and use the same.

This invention relates to an automatic loading device, designed for use with traveling conveyer belts having buckets thereon or other suitable receivers for granular material, and one of the principal objects of the invention is to provide an automatically operating shutter or closure for the bottom of a hopper, so that as the traveling conveyer passes underneath the discharge spout leading from the hopper, the closure or door will open and close automatically to discharge contents into the buckets or containers and to close between said containers so that the material will be discharged uniformly into the containers and closed to pass over the partitions between the buckets on the belt or conveyer.

Another object of the invention is to provide an automatic loading device which can be applied to the discharge end of any hopper and which will open and close over a traveling belt having buckets or containers for receiving the granular material fed from the hopper.

The foregoing and other objects may be attained by means of the construction illustrated in the accompanying drawings, in which—

Figure 1 is a vertical sectional view through a hopper and automatic loader and traveling conveyer showing the loader made in accordance with this invention, Fig. 2 is a vertical sectional view taken on the line 2—2 of Fig. 1, Fig. 3 is a top plan view of the automatic loader disconnected from the hopper, and Fig. 4 is a sectional view of the automatic loader and the conveyer belt below the same, said loader being shown with the door closed to stop the flow of material through the discharge end of the hopper into the traveling conveyer.

Referring to the drawing, the numeral 1 designates a hopper of the usual or any suitable construction provided with a sliding gate 2, and having a discharge pipe 3 connected to its lower end. As shown, the hopper 1 is provided with side braces or supports 4, which at their lower ends are bent inwardly to provide guide flanges 5 for supporting a casing 6 for a traveling conveyer. The casing 6 is provided with outwardly turned flanges 7 which engage the flanges 5 of the support 4, and mounted in the casing 6 is the traveling conveyer comprising separate buckets 8 having intermediate partitions 9. As shown the buckets or containers are made of sheet metal and the partitions comprise the spaced members 10 connected by a web at the top thereof.

It will be understood however, that the endless conveyer may be of any suitable form for use with the automatic loader, and no claim is made herein to the conveyer *per se*.

The automatic loader comprises a substantially rectangular box comprising a bottom 11 having an opening 12 therein for the discharge of the material and upwardly extending sides 13 and ends 14. Hinged to the bottom 11 on a pintle 15 is a door or closure 16.

For holding the loader in position under the discharge pipe 3 from the hopper threaded bolts 17 extend through the supports 4 and through the side walls 13 of the rectangular box, said bolts extending through spacing sleeves 18, and are provided with nuts 19 on their inner ends and locking nuts 20 which bear against the outer surfaces of the supports 4. The loader is thus rendered removable from the hopper and can be connected to any other hopper whenever desired.

Referring to Fig. 1, it will be observed that as the traveling conveyer moves in the direction indicated by the arrow, the door or closure 6 will be closed as the partitions pass underneath the same, and that the door will be thrown entirely open to discharge material from the hopper to the containers 8 as the belt moves along.

Various changes may be made in the details of construction without departing from the spirit and scope of the invention as defined in the claims.

What is claimed is:—

1. The combination with a moving conveyer having buckets or containers, the containers being separated by partitions, and a hopper, brackets secured to said hopper and depending downwardly therefrom inturned flanges on the lower end of said brackets, a loader supported by said brackets adjacent their lower ends, said loader positioned directly under the discharge end of said hopper, a closure hingedly secured to and depending from the under wall of said loader, and a support arranged in the inturned ends of said lower bracket, said closure adapted to be operated by the moving conveyer bucket, substantially as set forth.

2. The combination with a moving conveyer having buckets or containers, the buckets being separated by partitions, of a hopper, a discharge spout on said hopper, brackets secured to and depending from the upper end of said hopper their lower ends extending below the discharge end of said hopper, their lower ends being directed inwardly, a conveying support secured in the lower inturned ends of the said brackets, a loader supported in said bracket adjacent their lower end in direct alinement with the discharge end of said hopper, said loader comprising a bottom, and side walls, the bottom wall provided with a central opening, a hinged closer connected to and depending from the bottom wall of said loader, and adapted to close the openings therein by the moving conveyer operating against the same, substantially as described.

In testimony whereof I affix my signature in presence of two witnesses.

CALOGERO LAMENDOLA.

Witnesses:
J. C. SMITH,
LESTER F. SMITH.